US010510335B2

(12) United States Patent
Lazar et al.

(10) Patent No.: US 10,510,335 B2
(45) Date of Patent: Dec. 17, 2019

(54) MACHINE AND METHOD FOR ACOUSTIC WHITE NOISE GENERATION

(71) Applicants: Eli Stewart Lazar, Urbana, IL (US); Matthew Melvin George Snyder, Henderson, NV (US)

(72) Inventors: Eli Stewart Lazar, Urbana, IL (US); Matthew Melvin George Snyder, Henderson, NV (US)

( * ) Notice: Subject to any disclaimer, the term of this patent is extended or adjusted under 35 U.S.C. 154(b) by 0 days.

(21) Appl. No.: 15/246,901

(22) Filed: Aug. 25, 2016

(65) Prior Publication Data

US 2019/0348019 A1 Nov. 14, 2019

Related U.S. Application Data

(60) Provisional application No. 62/209,852, filed on Aug. 25, 2015.

(51) Int. Cl.
*G10K 15/04* (2006.01)
*G06F 3/16* (2006.01)
*H04W 76/10* (2018.01)

(52) U.S. Cl.
CPC .............. *G10K 15/04* (2013.01); *G06F 3/165* (2013.01); *H04W 76/10* (2018.02)

(58) Field of Classification Search
CPC ............................... G10K 15/04; G10K 7/02; G10K 9/00; G10K 9/12; G10K 3/00; G06F 3/165; H04W 76/10
USPC ... 381/56, 61, 124, 372, 379, 397, 411, 413, 381/430
See application file for complete search history.

(56) References Cited

U.S. PATENT DOCUMENTS

| | | | |
|---|---|---|---|
| 4,043,176 A | 8/1977 | Graham | |
| 5,689,261 A | 11/1997 | Mehta | |
| 6,045,329 A | 4/2000 | Sobala | |
| 8,270,657 B2 * | 9/2012 | Takigawa | H04R 1/1041 381/372 |
| 9,854,352 B2 * | 12/2017 | Huang | H04R 1/2896 |
| 2003/0067779 A1 | 4/2003 | Lo | |
| 2003/0098660 A1 | 5/2003 | Erdman | |
| 2003/0151316 A1 | 8/2003 | Vasilescu | |
| 2008/0267764 A1 | 10/2008 | Tsai | |
| 2008/0273305 A1 | 11/2008 | Lee | |
| 2009/0232340 A1 * | 9/2009 | Yang | H04R 1/2811 381/371 |
| 2010/0166245 A1 * | 7/2010 | Takigawa | H04R 1/1041 381/380 |
| 2011/0051975 A1 * | 3/2011 | Lee | H04R 1/1041 381/370 |
| 2014/0086729 A1 | 3/2014 | Peery | |

(Continued)

*Primary Examiner* — William A Jerez Lora
(74) *Attorney, Agent, or Firm* — Ellenoff Grossman & Schole LLP; James M. Smedley; Alex Korona

(57) ABSTRACT

Embodiments of the present invention are generally related to acoustic white noise machines. In particular, embodiments of the present invention are directed to an acoustic white noise machine that comprises a fan blade designed to shear airflow against a sharp edge in order to create broadband turbulent noise. Embodiments of the present invention may further include an adjustable enclosure that may be manipulated via the rotation or other movement of an outer shell to alter the amount of air being sheared by the fan blade, thereby changing the frequencies which resonate in the adjustable enclosure.

17 Claims, 18 Drawing Sheets

(56) References Cited

U.S. PATENT DOCUMENTS

2014/0271286 A1  9/2014  McNeill
2015/0104159 A1  4/2015  Tyburk

* cited by examiner

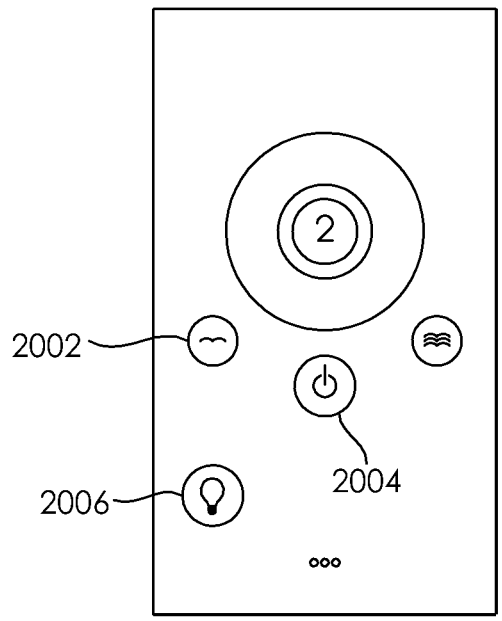
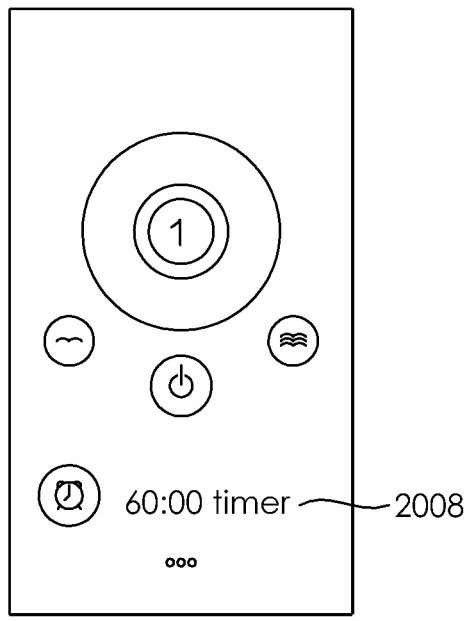
FIG. 20A  FIG. 20B
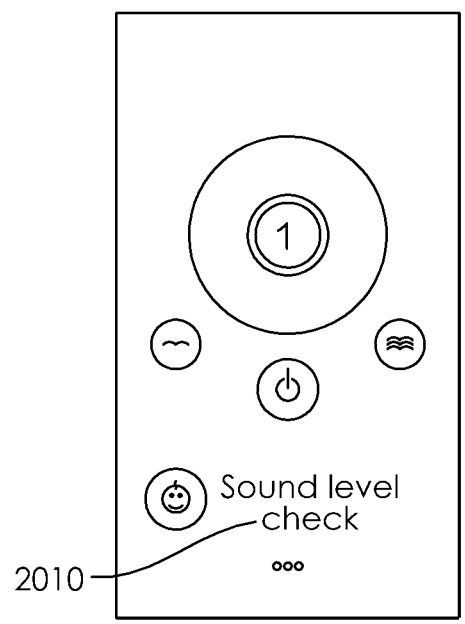
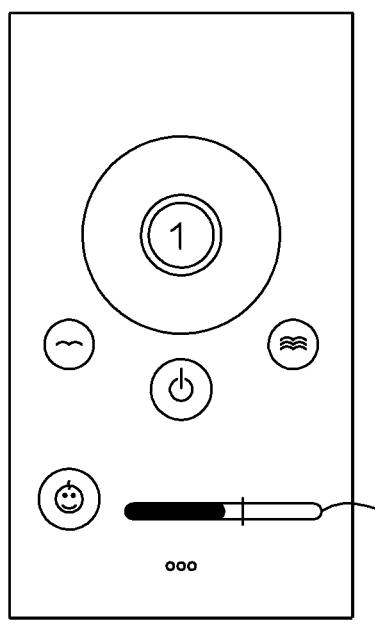
FIG. 20C  FIG. 20D

MACHINE AND METHOD FOR ACOUSTIC WHITE NOISE GENERATION

CROSS-REFERENCES TO RELATED APPLICATIONS

This application claims the benefit of U.S. Provisional Patent Application No. 62/209,852 entitled "Acoustic White Noise Machine" filed Aug. 25, 2015, the entire disclosure of which is incorporated herein by reference.

FIELD OF INVENTION

The present invention is related generally to a method and machine for generating acoustic white noise. More specifically, the present invention provides a compact acoustic white noise generation mechanism which is convenient to control and can be calibrated to a specified sound level.

BACKGROUND

Currently available white noise machines can be categorized into one of two categories: digital or acoustic. Digital white noise machines typically employ an audio speaker system to produce sound. On the other hand, acoustic white noise machines typically produce sound by using a fan blade system to generate noise.

The design of currently available acoustic white noise machines has not changed substantially for over fifty years and suffers from a variety of drawbacks. First, due to its reliance on moving sound porting closer and further away from a sheared airflow edge, the established design is limited to only controlling the volume exuded from the device without enabling the user to control the actual broadband turbulent noise created. This is because the current design does not provide for controlling the amount of air flow sheared which remains constant. Consequently this drawback significantly limits the variability in sound that can be produced by the device.

Further, the existing design depends on increasing airflow speed to increase volume. However, increased airflow speed also necessarily entails the increase of blade passing frequency and other undesirable phenomena which detrimentally impact sound quality. Therefore, this shortcoming also limits the potential volume range of the device. Added to the limited volume range are the ineffective overlapping methods of controlling the levels of the noise volume produced by the device. The prevailing design employs a combination of adjustable top vent holes and an outer rotating disk each operating independently to adjust the tone generated by the device. This arrangement results in a number of overlapping settings that are unnecessarily complicated and ineffective for accurately obtaining the desired tone.

Another drawback of the design on the market today is the significant air outflow produced by the device. Considering that the purpose and operating principle of the system is converting the kinetic energy of the air being driven by the fan into sound energy, having excess air outflow is indicative of wasted energy. However, the substantial cold air outflow is not simply a latent inefficiency of the design but is also a highly undesirable feature. This flaw may be especially detrimental if the device is used near cribs, which incidentally also highlights another widely noted drawback. In particular, as one of the most frequent uses of white noise machines is soothing infants to sleep, aside from cold air, safe volume limits also become an oft-cited and significant concern. As these units often remain on up to 8-12 hours per night, safe volume limits should be based on the prolonged continuous duration of device operation. The white noise machines currently available to consumers do not provide users with the means of ensuring safe operating volume during usage.

Finally, there is also a lack of any white noise machines configured to be controlled remotely without necessitating physical interaction with the device, as well as a lack of such machines which provide dim illumination to serve as nightlights during night time operation. For the foregoing reasons, there is a need for an acoustic white noise machine which is efficient and safe to use in a variety of settings and whose volume and tone can be accurately controlled. These and other features and advantages of the present invention will be explained and will become obvious to one skilled in the art through the summary of the invention that follows.

SUMMARY

The present invention is directed to a method of use and an apparatus that meets the abovementioned needs and addresses the faults noted above. Accordingly it is an object of the present invention to provide a compact, energy efficient, conveniently adjustable, and safe acoustic white noise machine which comprises a calibration feature as well as a lighting component. Embodiments of the present invention are generally related to acoustic white noise machines. In particular, embodiments of the present invention are directed to an acoustic white noise machine that comprises a fan blade designed to shear airflow against a sharp edge in order to create broadband turbulent noise. Embodiments of the present invention may further include an adjustable enclosure that may be manipulated via the rotation or other movement of an outer shell to alter the amount of air being sheared by the fan blade, thereby changing the frequencies which resonate in the adjustable enclosure.

In order to provide a user with precise means of regulating the tone and volume of the turbulent white noise created by the machine, embodiments of the present invention comprise a plurality of overlapping openings in the main body and exterior portions thereof which, via movement relative to each other, allow for the precise adjustment of the airflow between the interior and exterior of the machine. Further customization of user interaction with embodiments of the present invention is provided by the wireless communication means and control means on a remote mobile computing device configured to control the functions of the machine. Notably, because embodiments of the invention are intended to use in areas such as nurseries or children's bedrooms, a safe volume calibration feature is provided to either automatically or manually adjust the volume of the white noise generated by the machine to a safe level.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

These and other features, aspects, functions, and advantages of the present invention will become better understood with regard to the following description, appended claims, and accompanying drawings where:

FIGS. 20A-20D are views of a control interface of a mobile device configured to control the operation of an acoustic white noise machine in accordance with an embodiment of the present invention.

DETAILED SPECIFICATION

Figure 1:
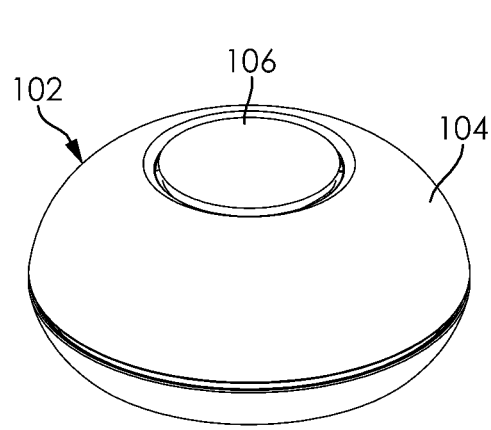
FIG. 1 is a side view of an acoustic white noise machine, in accordance with an embodiment of the present invention.

In the Summary above, in the Detailed Specification, the Claims below, and in the accompanying drawings, reference is made to particular features including method steps of the invention. It is to be understood that the disclosure of the invention in this specification includes all possible combinations of such particular features. For example, where a particular feature is disclosed in the context of a claim, that feature can also be used to the extent possible, in combination with and/or in the context of other particular aspects and embodiments of the invention and in the invention generally.

The term "comprises" and grammatical equivalents thereof are used herein to mean that other components, ingredients, steps, etc. are optionally present. For example, an article "comprising" (or "which comprises") components A, B, and C can consist of (i.e. contain only) components A, B, and C or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context exclude that possibility).

The term "at least" followed by a number is used here into the note the start of a range beginning with that number (which may be a range having an upper limit or no upper limit, depending on the variable being defined). For example, "at least one" means one or more than one. The term "at most" followed by a number is used here into the note the end of a range ending with that number (which may be a range having 1 or 0 as its lower limit, or a range having no lower limit, depending upon the variable being defined). For example "at most 4" means four or less than 4, and "at most 40%" means 40% or less than 40%. When, in the specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Embodiments of the present invention are generally related to acoustic white noise machines. In particular, embodiments of the present invention are directed to an acoustic white noise machine that comprises a fan blade designed to shear airflow against a sharp edge in order to create broadband turbulent noise. Embodiments of the present invention may further include an adjustable enclosure that may be manipulated via the rotation or other movement of an outer shell to alter the amount of air being sheared by the fan blade, thereby changing the frequencies which resonate in the adjustable enclosure.

According to an embodiment of the present invention, an acoustic white noise machine is provided that utilizes a specialized fan blade to shear airflow against a sharp edge, which then creates broadband turbulent noise. The broadband turbulent noise is then filtered through a tunable acoustic enclosure. In a preferred embodiment, the tunable acoustic enclosure may be adjusted through rotation of an outer shell of the enclosure. Rotation of the outer shell opens and closes one or more vent holes in the enclosure, which varies the amount of air flow through enclosure, thereby changing the amount of air being sheared by the fan blade. This change in the amount of air being sheared by the fan blade changes frequencies of the broadband turbulent noise.

Turning to FIGS. 1-4, an acoustic white noise machine, in accordance with an embodiment of the present invention, is shown. In a preferred embodiment of the present invention, the acoustic white noise machine comprises an enclosure 102 with at least one rotatable outer shell section 104. In the figures shown, the rotatable outer shell is located on an upper portion 1514 of the enclosure. Rotation of this rotatable outer shell works to adjust the tone of the broadband turbulent noise generated by the acoustic white noise machine.

According to an embodiment of the present invention, an acoustic white noise machine may further comprise an interactive element 106 for turning on and off power provided to the acoustic white noise machine. In a preferred embodiment, as shown in FIG. 1, the interactive element 106 for turning on and off power may be a push button. In other embodiments, the interactive element 106 for turning on and off power may include, but are not limited to, buttons, dials, knobs, touch sensitive components (e.g., capacitive touch sensor), communication means allowing for connection (e.g., BLUETOOTH, WIFI) to the acoustic white noise machine via a computing device 502 (e.g., tablet PC, smartphone), or any combination thereof. One of ordinary skill in the art would appreciate that there are numerous types of interactive elements for turning on and off power that could be utilized with embodiments of the present invention, and embodiments of the present invention are contemplated for use with any such elements.

Figure 2:
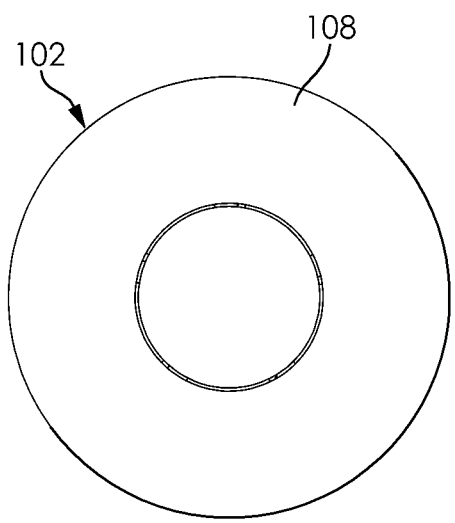
FIG. 2 is a top view of an acoustic white noise machine, in accordance with an embodiment of the present invention.

According to an embodiment of the present invention, an acoustic white noise machine may further comprise an adjustable volume component. In a preferred embodiment, as shown in FIG. 2, the adjustable volume component could be a precision volume dial 108, allowing for a user to vary the volume of the device by turning the dial. In other embodiments, the adjustable volume component may include, but are not limited to, dials, knobs, touch sensitive components, switches, levers, or communications means for allowing connection to the acoustic white noise machine via a computing device, or any combination thereof. One of ordinary skill in the art would appreciate that there are numerous types of adjustable volume components that could be utilized with embodiments of the present invention, and embodiments of the present invention are contemplated for use with any such components.

Figure 3:
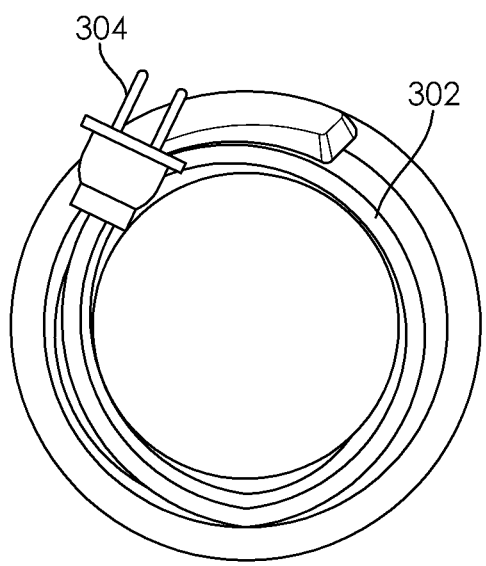
FIG. 3 is a bottom view of an acoustic white noise machine, in accordance with an embodiment of the present invention.

According to an embodiment of the present invention, an acoustic white noise machine may further comprise a power cord storage area. In a preferred embodiment, as shown in FIG. 3, the power cord storage area 302 may be comprised of a cavity formed in a lower region of the enclosure. In other embodiments, the power cord 304 storage area could be formed in other regions of the enclosure 102. One of ordinary skill in the art would appreciate that there are numerous acceptable regions where the power cord storage area could be formed, and embodiments of the present invention are contemplated for use with any appropriate power cord storage area.

Figure 4:
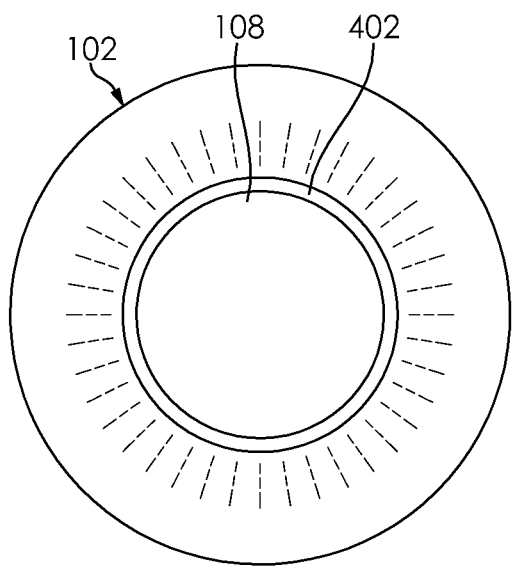
FIG. 4 is a top view of an acoustic white noise machine, in accordance with an embodiment of the present invention.
Figure 5A:
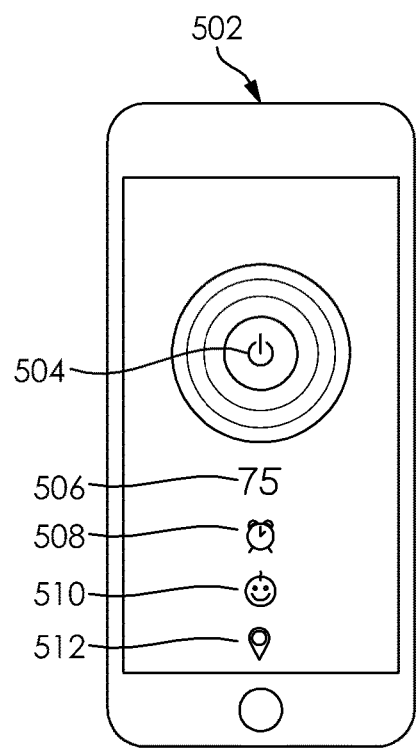
FIGS. 5A-5D illustrate a graphical user interface (GUI) on a mobile computing device, for use with an acoustic white noise machine, in accordance with an embodiment of the present invention.
Figure 5B:
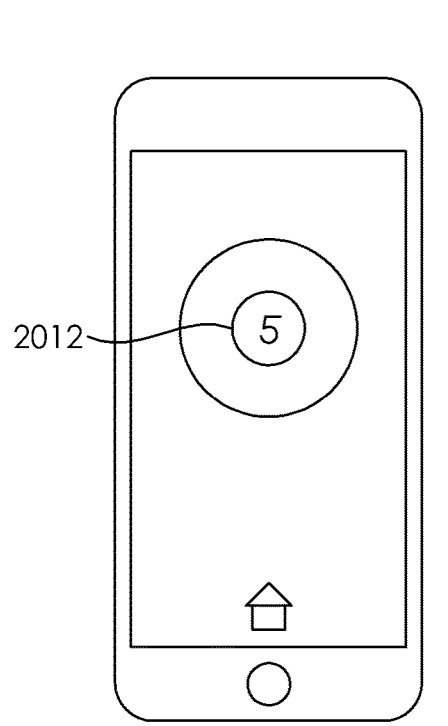
Figure 5C:
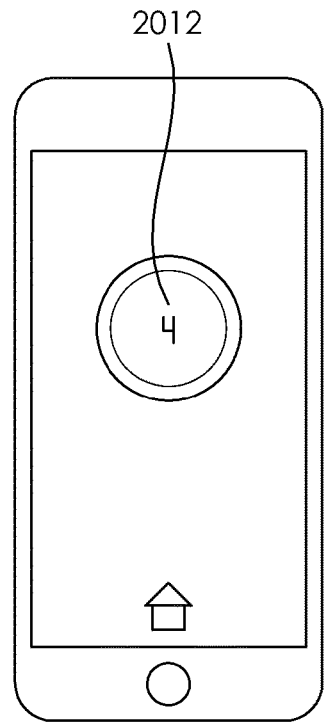
Figure 5D:
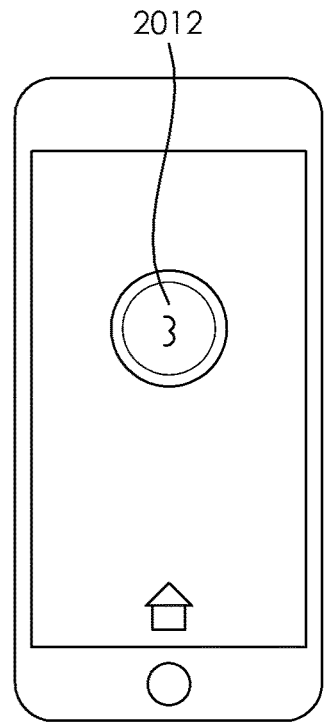

According to an embodiment of the present invention, an acoustic white noise machine may further comprise a lighting element. In a preferred embodiment, as shown in FIG. 4, the lighting element 402 may be a nightlight formed from one or more light emitting diodes (LED) or other illumination source, situated beneath or around an exterior depression of a precision volume dial 108. In other embodiments, the lighting element 402 could be located in other areas on the enclosure 102, such as on a side of the enclosure, on a lower region 1504 of the enclosure or any combination thereof. Further, certain embodiments may include more than one lighting element in one or more locations on the enclosure. One of ordinary skill in the art would appreciate that there are numerous acceptable regions where the lighting element could be located as well as numerous types of lighting elements that could be utilized, and embodiments of the present invention are contemplated for use with any appropriate lighting element and location for said lighting element(s).

According to an embodiment of the present invention, an acoustic white noise machine may be configured to communicate with a remote computing device 502, such as a tablet PC, desktop PC, smartphone or other computing device. In a preferred embodiment, the acoustic white noise machine may comprise a communications module that allows for communication with a remote computing device 502 via a Bluetooth, WIFI or other wireless communications protocol. In other embodiments, a wired connection could be utilized (e.g., USB). One of ordinary skill in the art would appreciate that there are numerous types of communications modules that could be utilized with embodiments of the present invention, and embodiments of the present invention are contemplated for use with any appropriate type of communications module.

In conjunction with the communications module, embodiments of the acoustic white noise machine may communicate with a remote computing device 502 in order to allow control/calibration of the acoustic white noise machine by the remote computing device. For instance, in a preferred embodiment, an application on a tablet PC or smartphone 502 may connect to the acoustic noise machine in order to provide various functions, including, but not limited to, turning the machine on/off 504, setting a timer or schedule 508 for the acoustic white noise machine, altering the volume 506, calibrating 510 for use in a setting where particular noise levels are desired (e.g., nursery), turning on/off of the lighting element 512, or any combination thereof. One of ordinary skill in the art would appreciate that there are numerous functions that could be provided via connection to the machine via the communications module, and embodiments of the present invention are contemplated for use with any appropriate type of functionality.

According to an embodiment of the present invention, an acoustic white noise machine may utilize a connection with a remote computing device 502 in order to calibrate volume levels of the machine for particular applications. For instance, for use in a nursery, where volume levels should not exceed certain thresholds in order to ensure no harm is done to the sensitive hearing of an infant, the acoustic white noise module may utilize a connection with the remote computing device 502 to calculate decibel levels at the location of the crib (e.g., via microphone integrated into a smartphone/tablet PC) and adjust the volume level of the machine accordingly to appropriate levels. The adjustment could be done automatically by the acoustic white noise machine based on the detected decibel levels. In other embodiments, the adjustment could be processed on the remote computing device 502 and effected on the machine via editing of the volume levels.

Figure 6A:
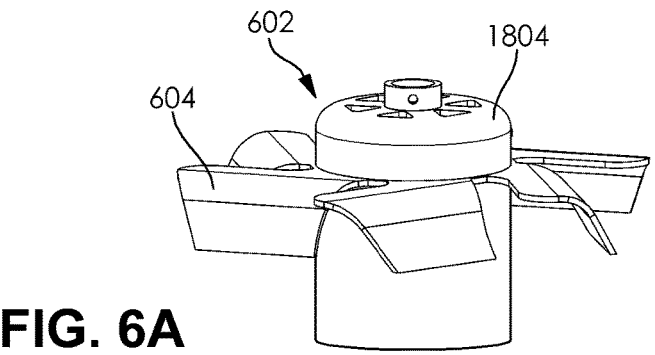
FIGS. 6A-6B are side and cutaway views of a fan blade and interior components utilized in an acoustic white noise machine, in accordance with an embodiment of the present invention.
Figure 6B:
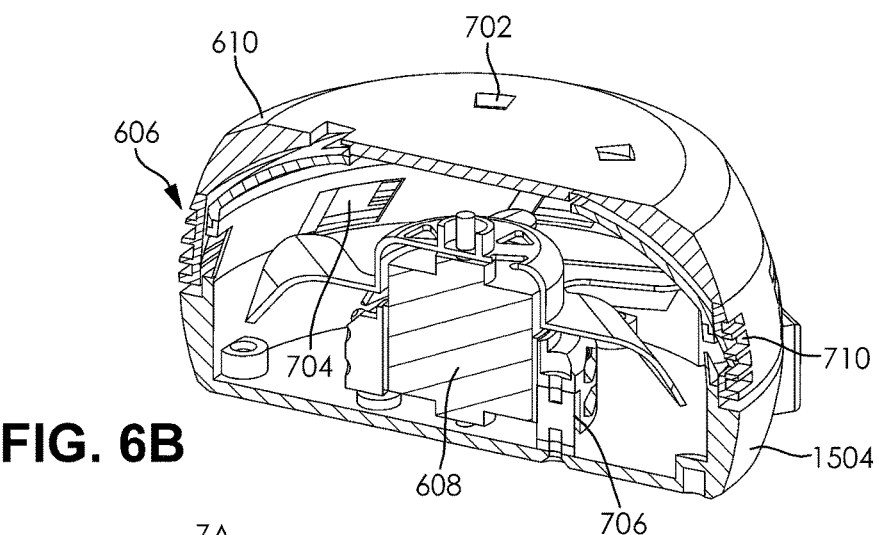

According to an embodiment of the present invention, an acoustic white noise machine utilizes a specialized fan 602 blade design that is configured to maximize potential frequencies while concurrently maximizing the potential to provide a compact enclosure 102. In preferred embodiments, as shown in FIGS. 6A-6B, the fan blade 604 is designed to wrap around a motor 608 that drives the fan blade 604. By reaching down and around the motor 608, the fan blade 604 provides a compact design while maximizing the volume of air above the fan blades 604. This increase in the volume of air above the fan blade 604 is important as it determines which frequencies will resonate in the enclosure 606.

Figure 7A:
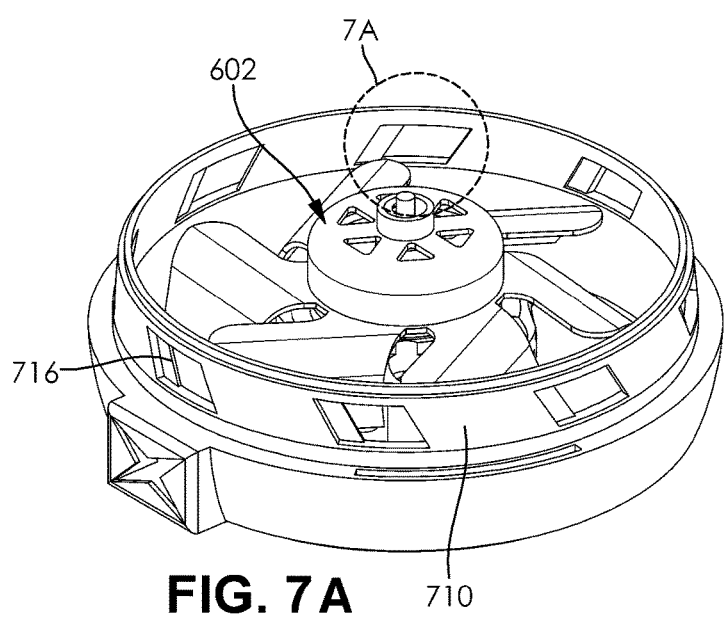
FIGS. 7A-7B are detailed schematics of an acoustic white noise machine, in accordance with an embodiment of the present invention.
Figure 7B:
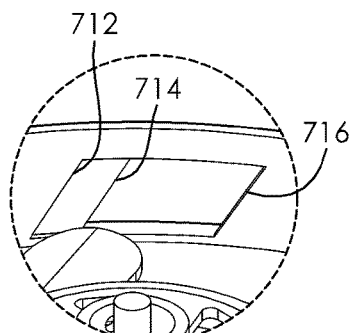
Figure 8:
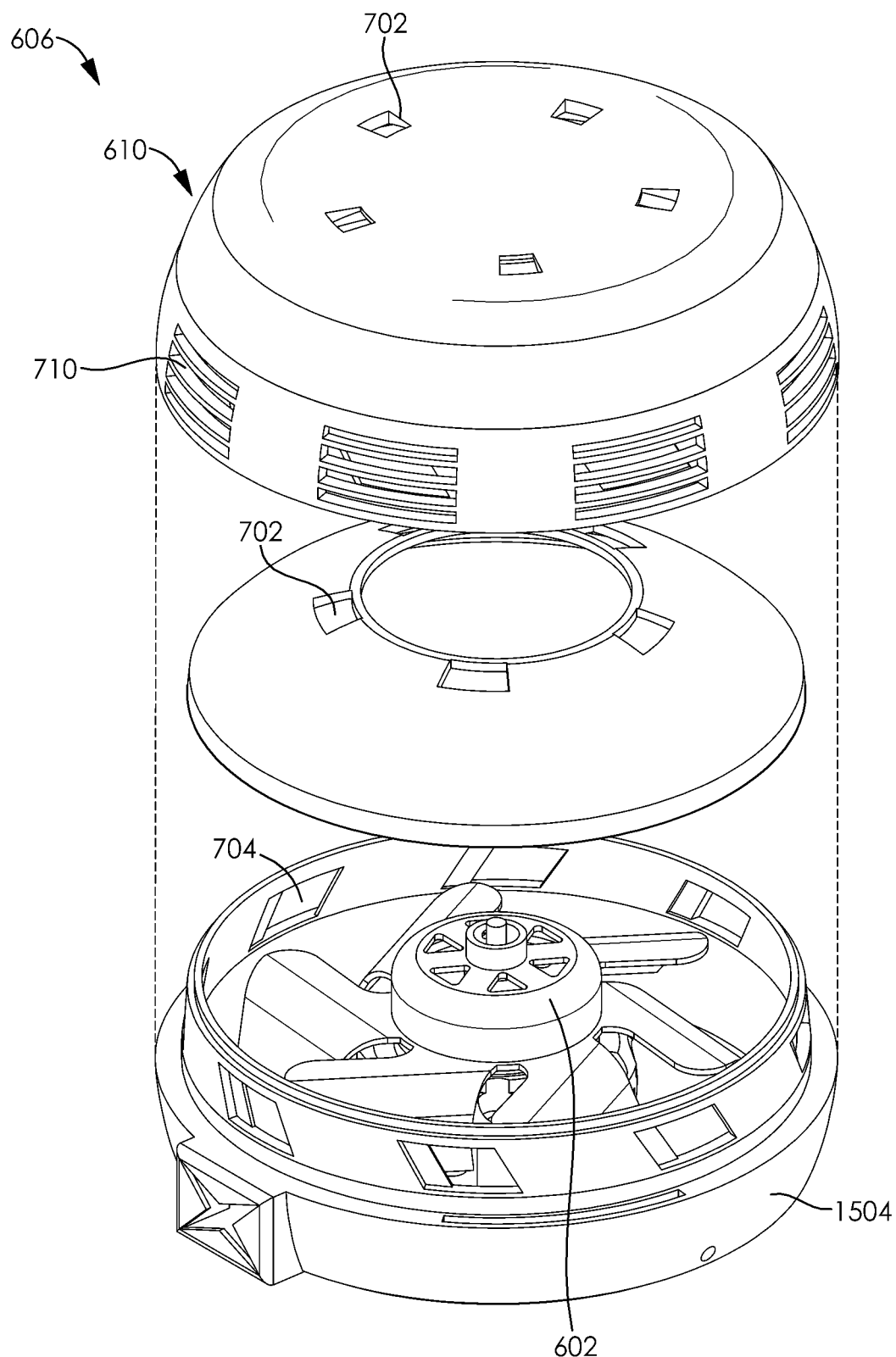
FIG. 8 is an exploded view of an acoustic white noise machine, in accordance with an embodiment of the present invention.

Turning now to FIGS. 7-8, multiple cross-sectional views of a preferred embodiment of an acoustic white noise machine are shown. FIGS. 7-8 show multiple features of the enclosure 606 and interior components and how they interact and work together to generate acoustic white noise. In particular, FIGS. 7-8 illustrate an enclosure 606 with top intake ports 702, exit vents 704, motor 608, motor insulation 706, fan blade 604, adjustment ring 710 and rubber feet 1502.

Figure 10A:
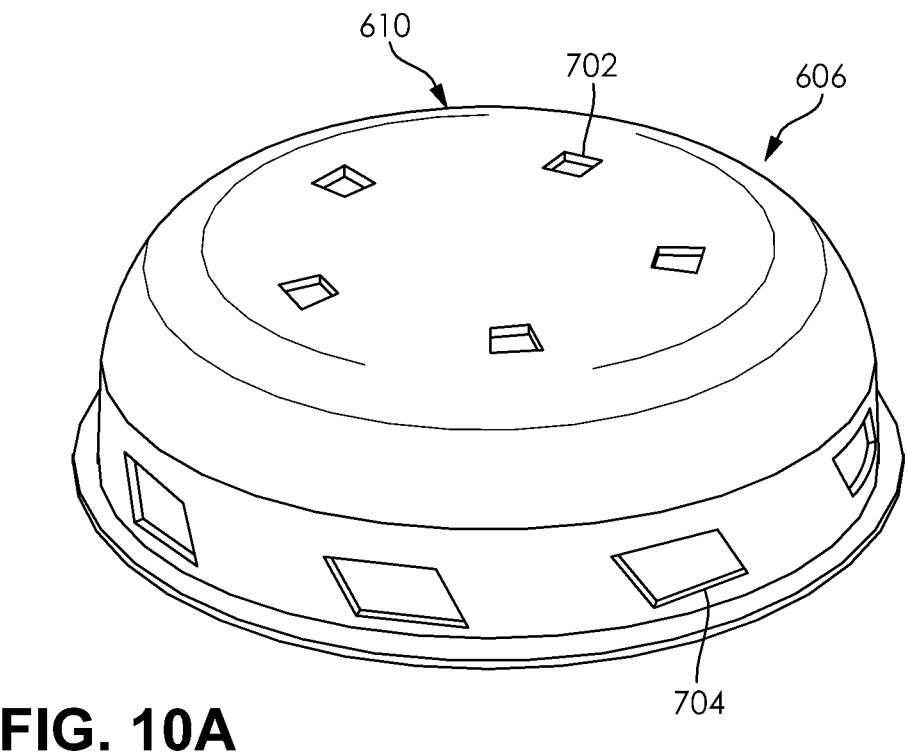
FIGS. 10A-10B comprise multiple views of an enclosure for use in an acoustic white noise machine, in accordance with an embodiment of the present invention.
Figure 10B:
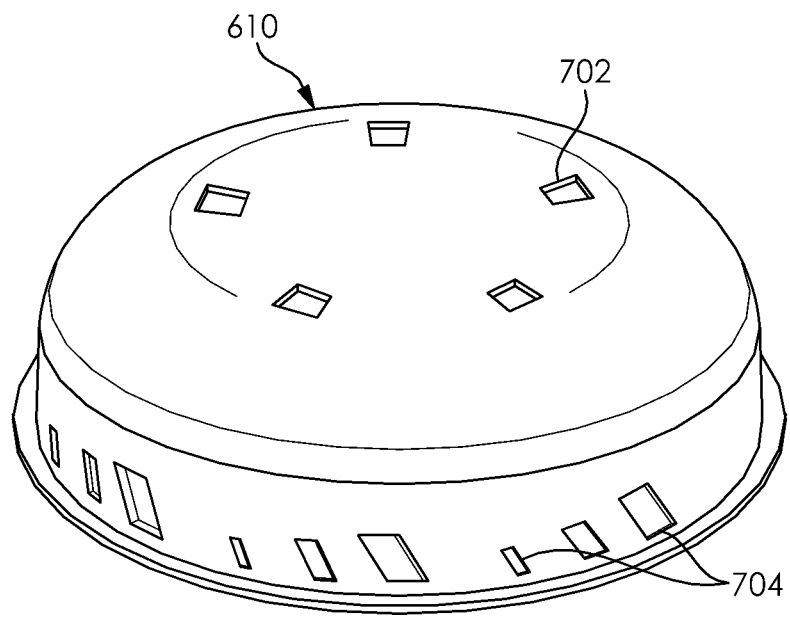
Figure 11A:
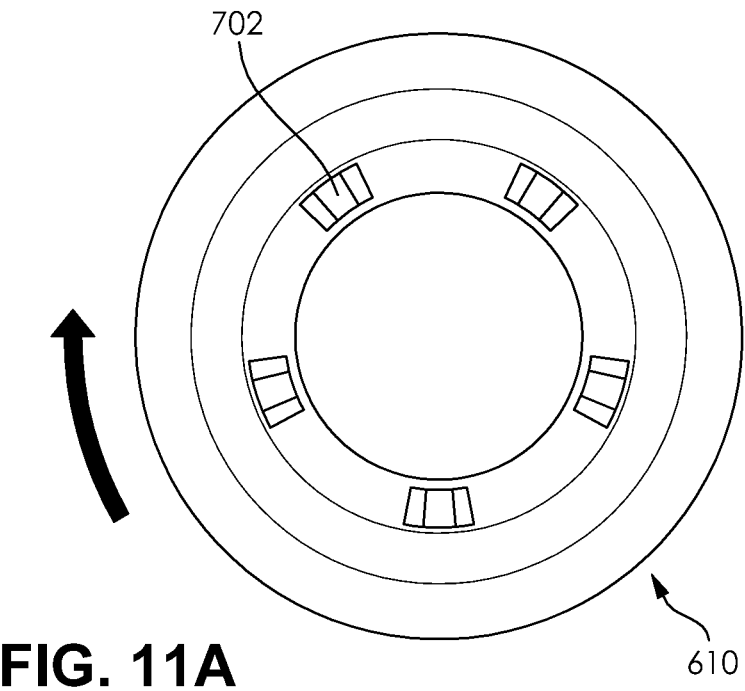
FIGS. 11A-11B comprise multiple views of an enclosure for use in an acoustic white noise machine, in accordance with an embodiment of the present invention.
Figure 11B:
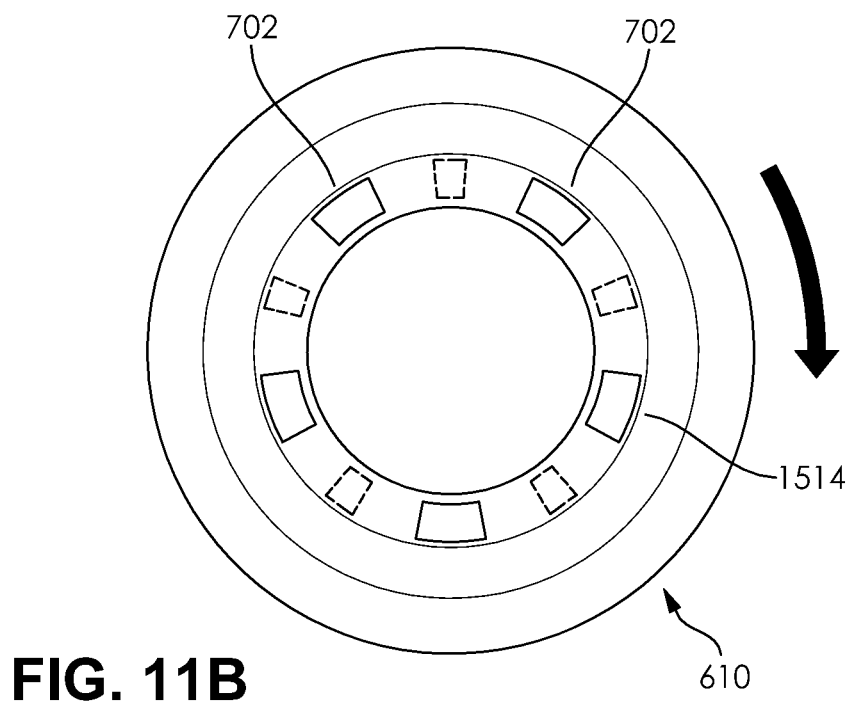

According to an embodiment of the present invention, the top intake ports 702 are formed in a top portion 610 of the enclosure 606 to allow for the inflow of air to the fan 602. FIGS. 10-11 also show the top intake ports 702 in the enclosure 606 and how adjustment of the intake ports 702 may be accomplished in certain embodiments through a rotatable or otherwise adjustable top section 610 of the enclosure 606. By adjusting the amount or number of open intake ports 702, or the amount by which each of them is respectively opened, airflow is changed through the enclosure 606, thereby assisting in the change of frequencies of broadband white noise generated by the machine.

According to an embodiment of the present invention, the exit vents 704 are optimized for pitch control and acoustic resonance and reduce external air disturbances. In preferred embodiments, exit vents 704 are comprised of one or more of a false step 712, a trailing edge 714 and a leading edge 716. The false step 712 helps air directly impact the trailing edge 714 and works with the trailing 714 edge to generate a soft pitch. The leading edge 716 generates a throaty pitch. Edge thickness is calibrated for optimal sound generation. Further, in a preferred embodiment, the edges of the exit vents 704 are angled in a way that mirrors the fan blade 604 angle so that propelled air collides with the exit edges all at once.

According to an embodiment of the present invention, the adjustment ring 710 is configured to allow the adjustment of an enclosure portion 610 in relation to the exit vents 704 and changes the focus of circulated air between the leading edge(s) 716 and the trailing edge(s) 714 in order to change the pitch of the white noise generated.

According to an embodiment of the present invention, the motor 608 is configured to drive the fan blade 604. In a preferred embodiment of the present invention, the motor 608 may be an efficient DC brushless motor. In other embodiments, the motor may 608 be selected from any type of motor capable of driving the fan blade 604 inside the enclosure 606. One of ordinary skill in the art would appreciate that there are numerous types of motors 608 that could be utilized with embodiments of the present invention, and embodiments of the present invention are contemplated for use with any type of motor.

According to an embodiment of the present invention, the motor insulation 706 is configured to minimize noise and vibrations caused by the motor 608. In a preferred embodiment, the motor insulation 706 is provided by way of an insulated motor housing 702 around the motor 608 itself. In other embodiments, insulation may be applied to the outside of the motor in order to provide the desired effects. Insulation 706 may be selected from any type of insulation that would be suitable for direct or indirect contact with the motor 608 or for use as housing for the motor. One of ordinary skill in the art would appreciate that there are numerous types of motor insulations that could be utilized with embodiments of the present invention, and embodiments of the present invention are contemplated for use with any type of motor insulation.

According to an embodiment of the present invention, one or more rubber feet 1502 may be utilized to eliminate surface vibration. In other embodiments, the feet 1502 may be made of other substances capable of reducing surface friction, including, but not limited to, silicone. One of ordinary skill in the art would appreciate that there are numerous materials that could be used for the feet 1502, and embodiments of the present invention are contemplated for use with any appropriate materials.

Figure 9A:
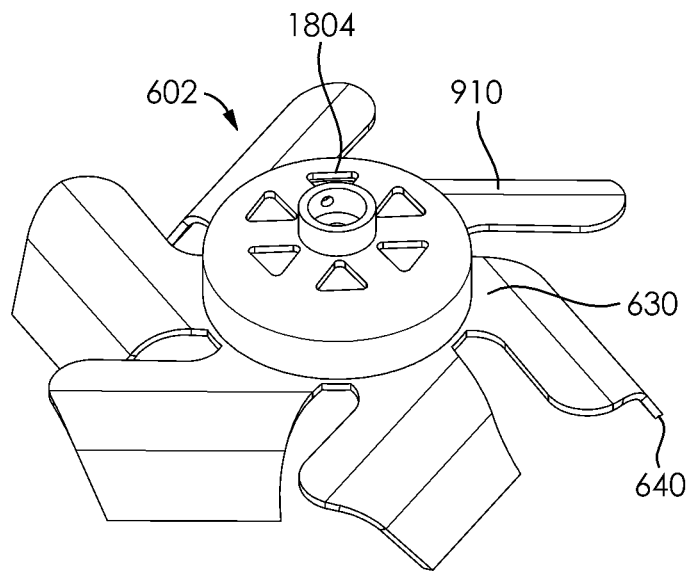
FIGS. 9A-9C comprise multiple views of a fan blade for use in an acoustic white noise machine, in accordance with an embodiment of the present invention.
Figure 9B:
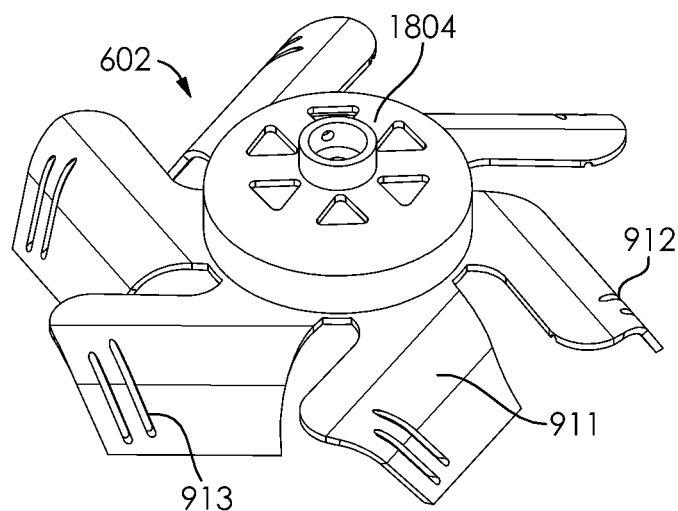
Figure 9C:
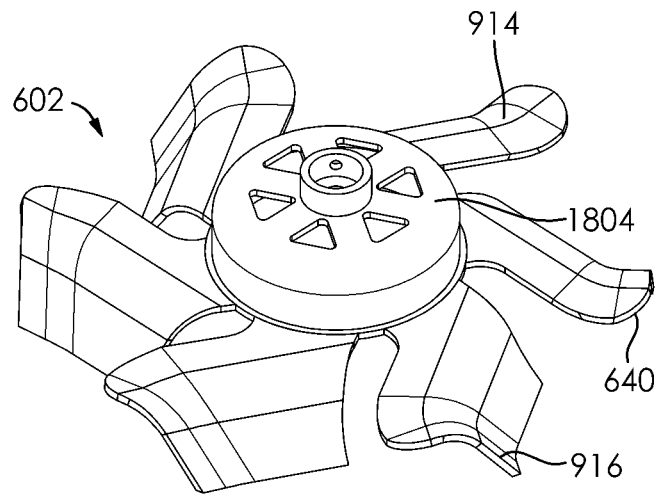

Turning now to FIG. 9, several versions of a fan 602 are shown, in accordance with various embodiments of the present invention. A first fan blade 910 is shown (left) that has been optimized for improved air flow while retaining its compact form. A second fan blade 912 (center) is shown with slits 913 added to each blade arm 911 in order to increase turbulence and improve sound generation over the first fan blade 910. A third fan blade 914 is shown (right) that shows a fan blade with outwardly bent tips 916 so shaped in order to spread airflow pulse past the exit vents 704 over a greater time duration, thereby lowering blade passing frequency intensity. One of ordinary skill in the art would appreciate that certain embodiments of the present invention may utilize fan blades incorporating elements from any of these exemplary embodiments.

Figure 12:
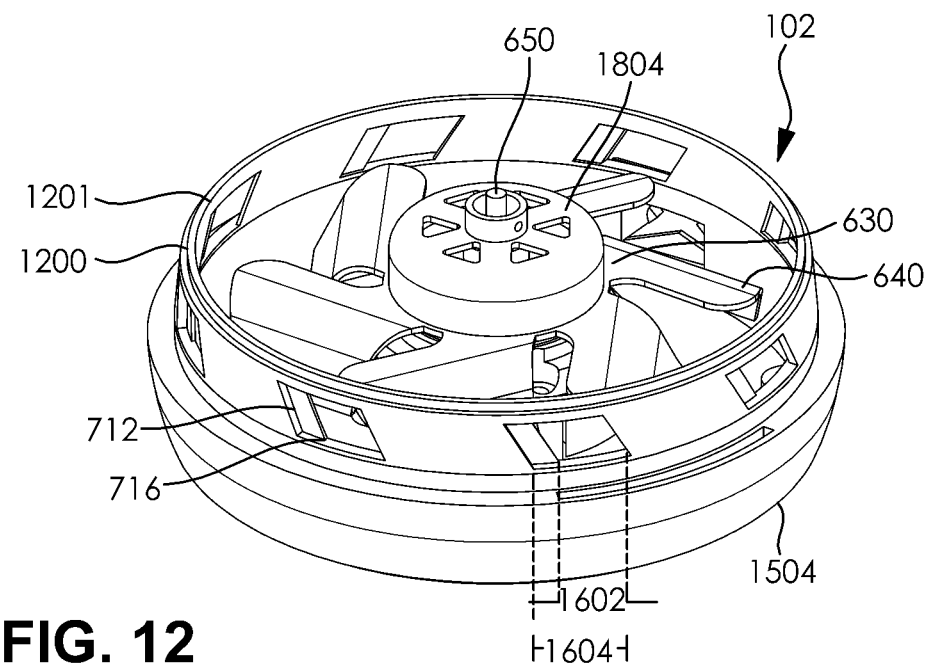
FIG. 12 is a perspective interior view of an acoustic white noise machine, in accordance with an embodiment of the present invention.

Turning now to FIG. 12, an exemplary embodiment of the interior of the enclosure is shown. An inner design of the enclosure comprises two offset cylinders 1200, 1201. A first edge 714 of the offset cylinder 1200 is used to force the airflow to move along the outer cylinder 1200 wall. The airflow moving along the outer cylinder 1200 wall is then driven directly into the downstream edge 716 of the inner cylinder 1201.

Figure 13A:
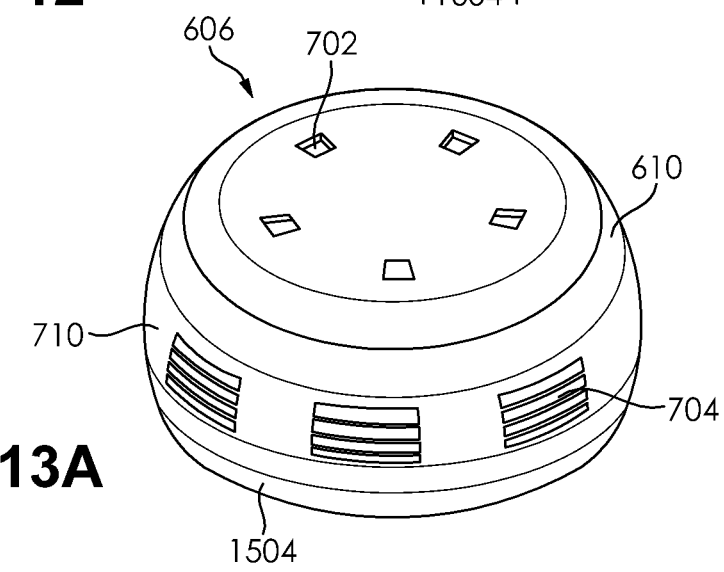
FIGS. 13A-13C comprise views of an acoustic white noise machine, in accordance with an embodiment of the present invention.
Figure 13B:
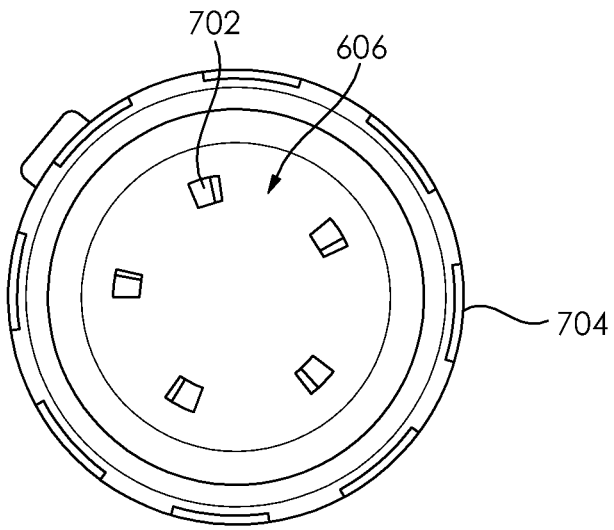
Figure 13C:
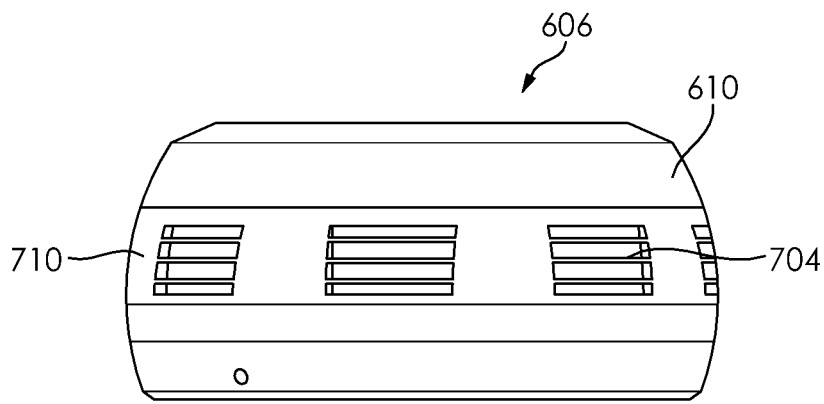
Figure 14A:
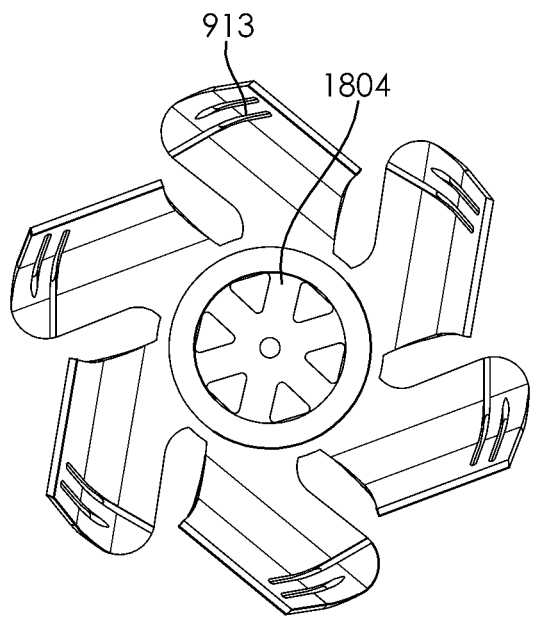
FIGS. 14A-14D comprise views of a fan blade for use in an acoustic white noise machine, in accordance with an embodiment of the present invention.
Figure 14B:
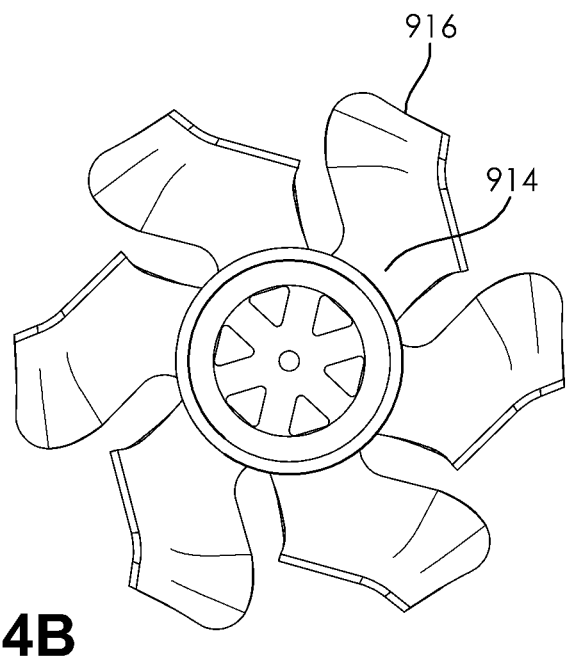
Figure 14C:
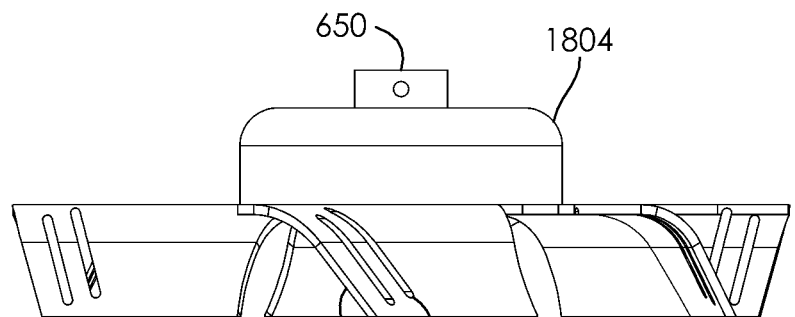
Figure 14D:
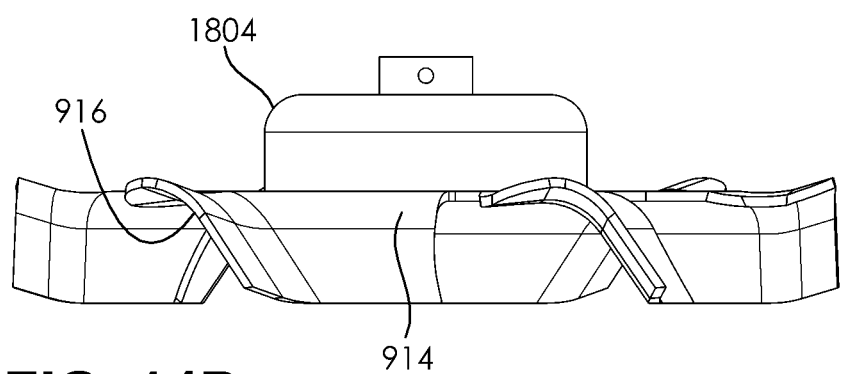
Figure 15A:
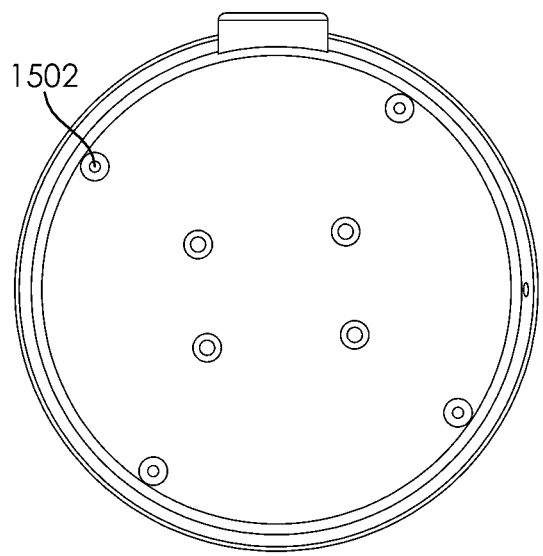
FIGS. 15A-15C comprise views of an enclosure for use in an acoustic white noise machine, in accordance with an embodiment of the present invention.
Figure 15B:
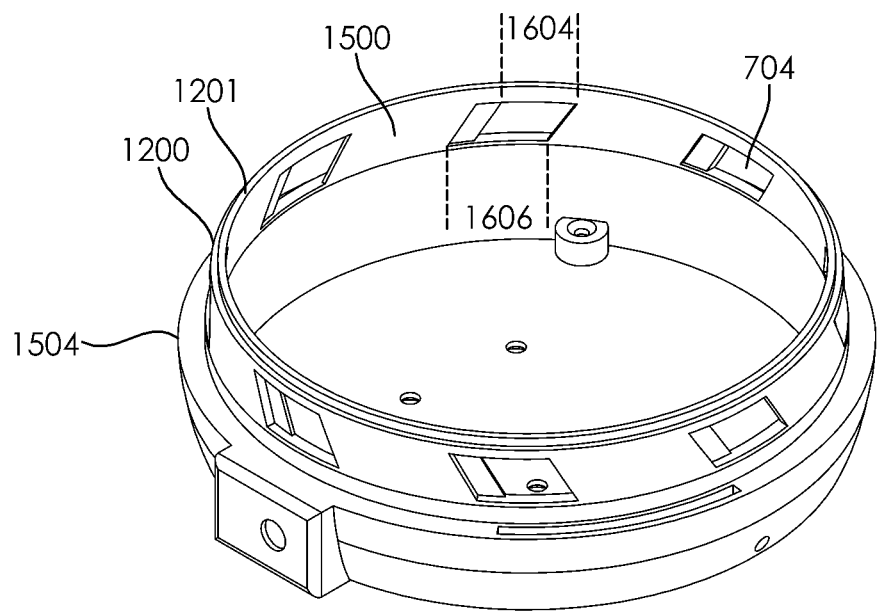
Figure 15C:
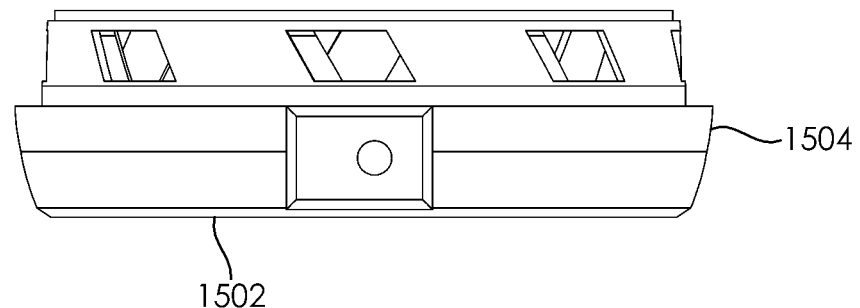

FIGS. 13A-13C, 14A-14D and 15A-15C show exemplary embodiments of a preferred embodiment of the present invention and options thereto. FIGS. 13A-13C show the upper portion 610 of the enclosure 606. FIGS. 14A-14D show various embodiments of exemplary fan blades 911, 914 for use inside the enclosure 606. FIGS. 15A-15C show various views of an exemplary embodiment of a lower portion 1504 of the enclosure.

Figure 16:
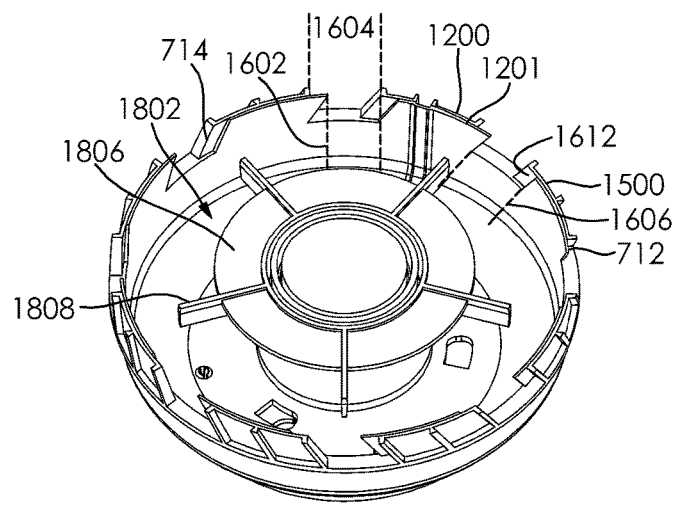
FIG. 16 is a cutaway view of the interior of an enclosure of an acoustic white noise machine in accordance with an embodiment of the present invention.
Figure 17:
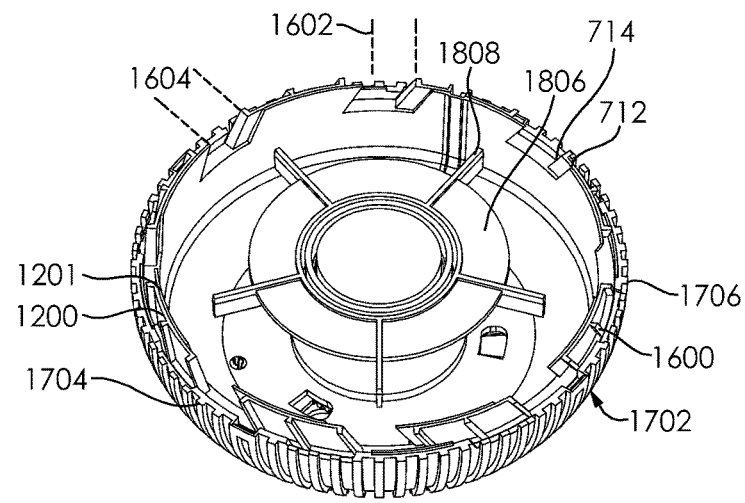
FIG. 17 is a cutaway view of a portion of an enclosure of and an outer shell of an acoustic white noise machine in accordance with an embodiment of the present invention.

Turning now to FIGS. 16-17, a portion of the interior of the housing 1600 of an exemplary embodiment of the present invention is shown. In particular, the openings 1602 created by rotationally offset concentric components 1200, 1201 of the housing 1600 are depicted. In particular, FIG. 16 illustrates how a partial overlap of the orifices 1604 of the outer concentric component 1200 and the orifices 1606 of the inner concentric component 1201 combine to create holes 1602 in the wall 1500 of the housing. It further shows, for each opening 1602, the detailed construction of an upstream edge 716 and a downstream edge 714. There is a recessed lip 1612 created along the downstream edge 714 to allow airflow to line up with the upstream edge 716. FIG. 17 likewise depicts an inner portion of the housing 1600 of an embodiment of the present invention but also shows a cutaway of an outer shell 1702 of the embodiment. In accordance with this embodiment the outer shell contains multiple holes 1704 and is configured to rotate around the housing 1600. As the shell 1702 is rotated, solid portions 1706 thereof may cover the openings 1602 formed by the partially overlapping orifices 1604, 1606 of the abovementioned concentric components 1200, 1201 thereby changing the length and depth of the opening. Consequently, as the dimensions of the opening are changed, so do the sound pressure levels and acoustic frequencies produced by the embodiment of the invention.

Figure 18A:
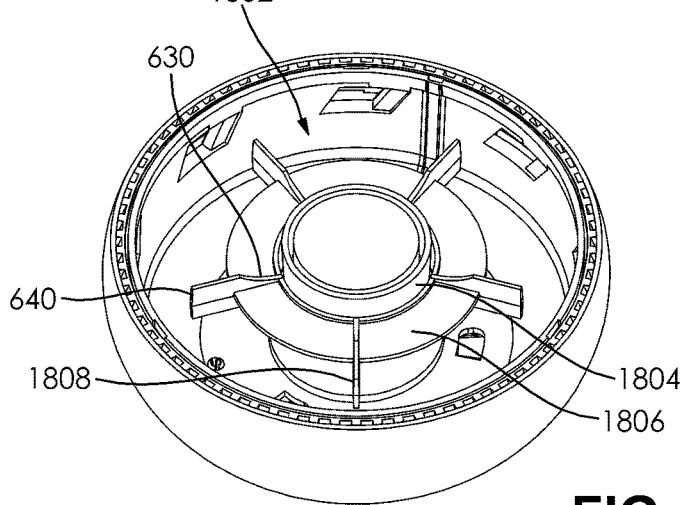
FIGS. 18A-18F are cutaway, perspective, and cross-sectional views of embodiments of an acoustic white noise machine of the present invention displaying embodiments of the impeller fan and its displacement within an embodiment of the present acoustic white noise machine invention.
Figure 18B:
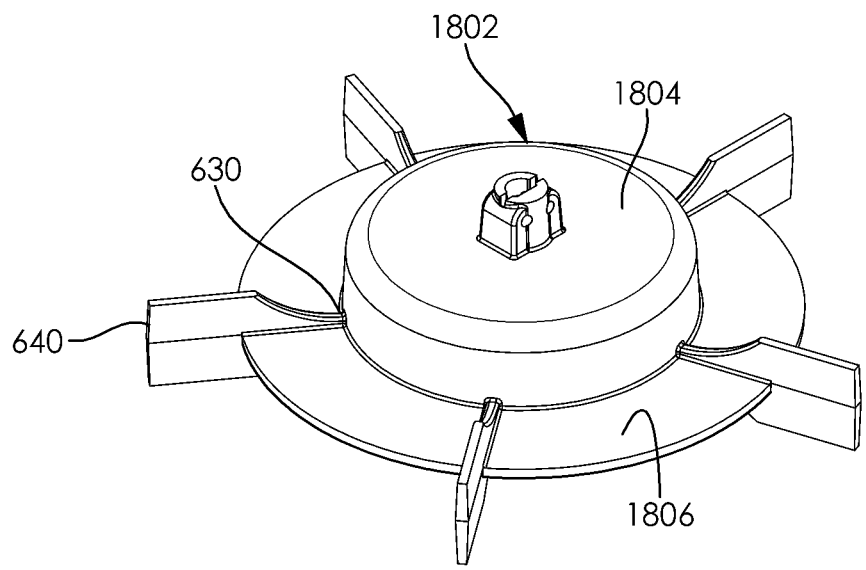
Figure 18C:
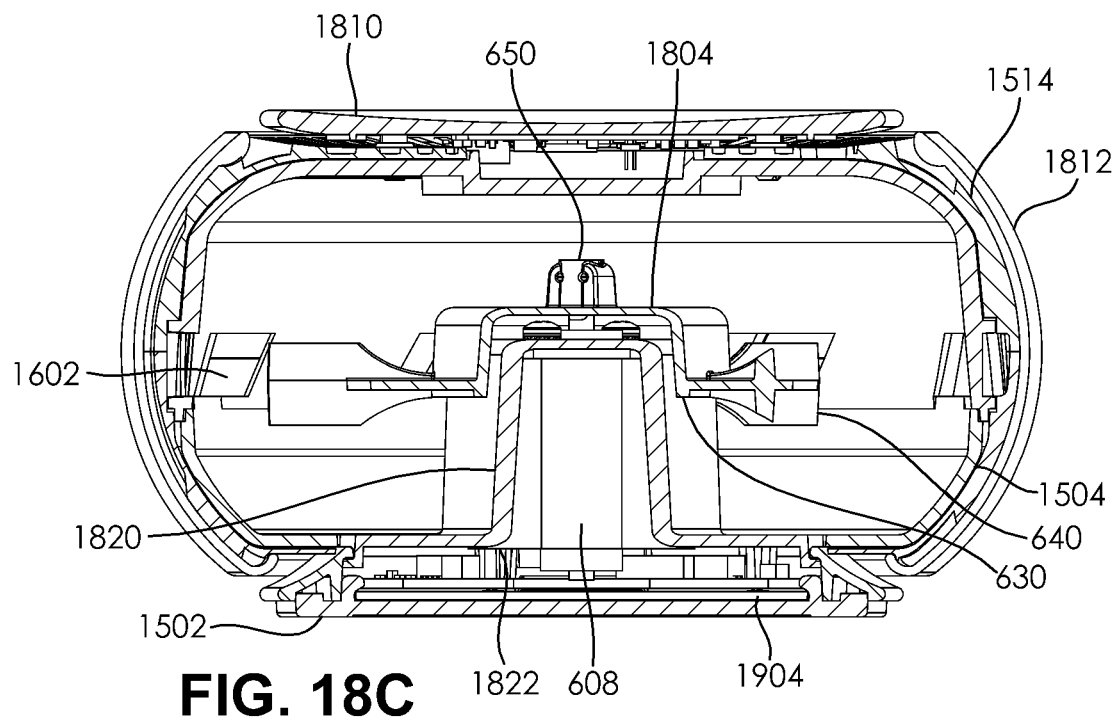
Figures 18D, 18E:
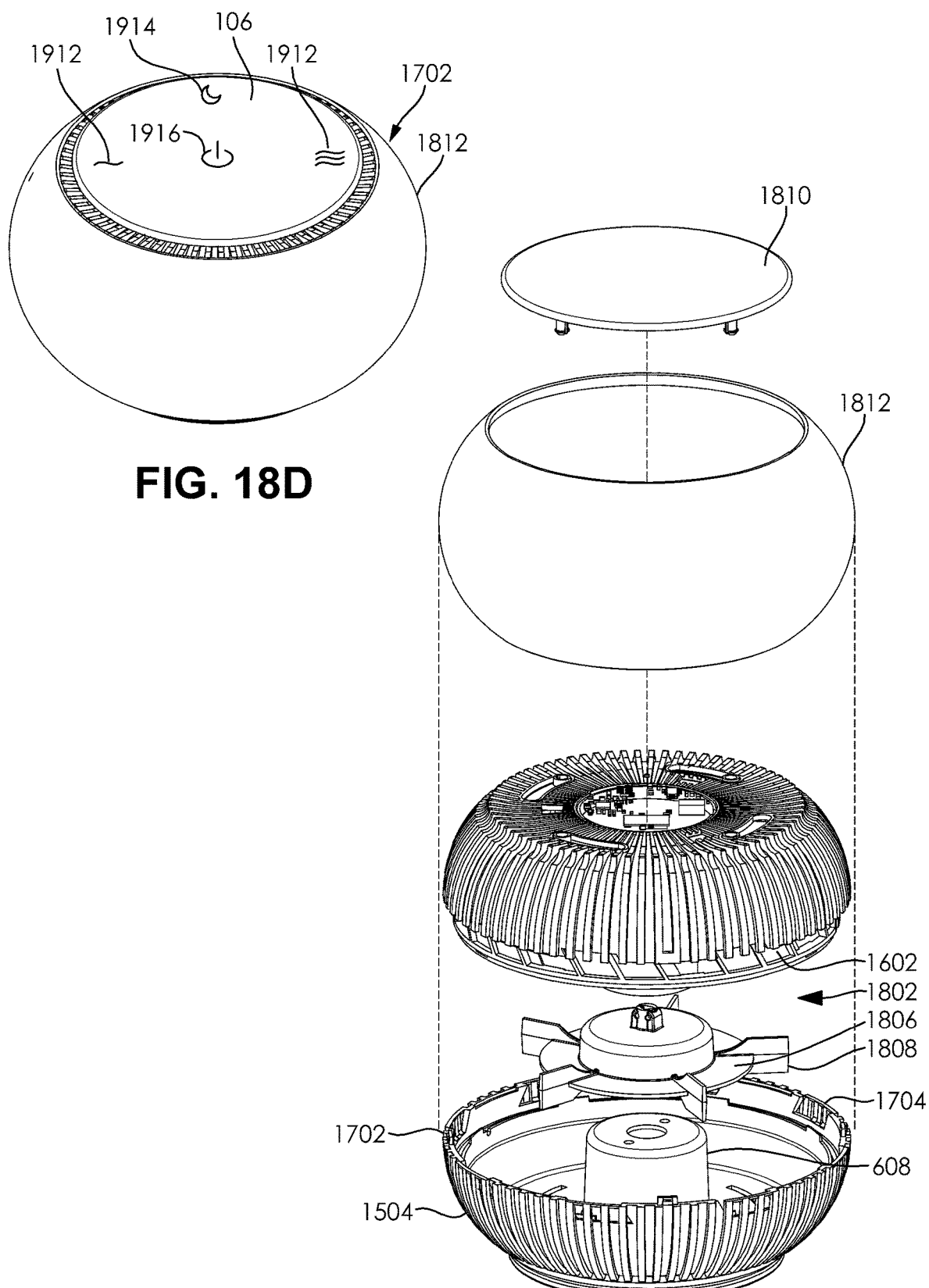
Figure 18F:
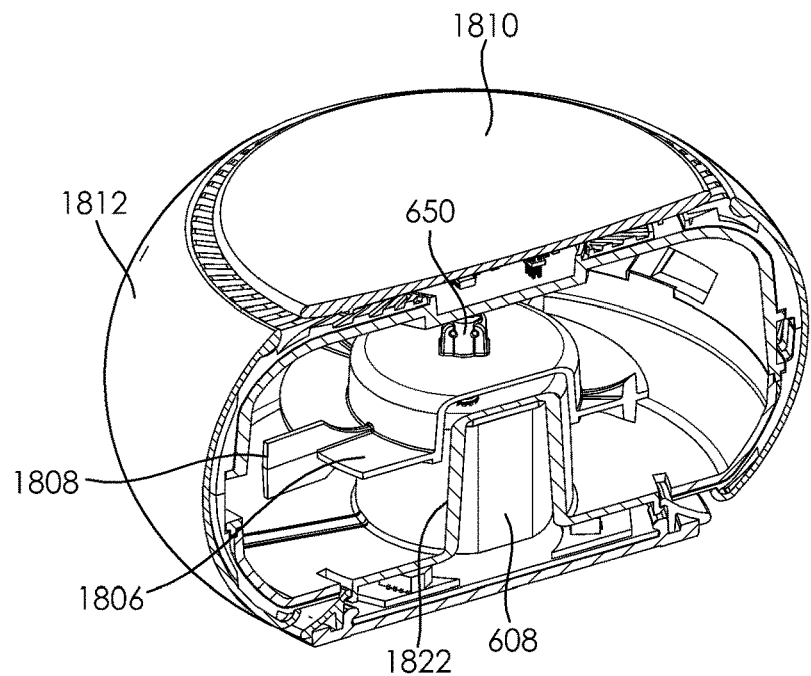

Yet another preferred embodiment of the invention is depicted in FIGS. 18A-18C which depict an impeller type rotor 1802 mounted on the motor 608 as well as a number of cavities 1602 within the wall 1500 of the housing 1600. While the central portion 1804 of the rotor 1802 is likewise domed partially around the motor 608 as in the fans of the embodiments described above, this embodiment comprises a combination of the disc shaped protrusion 1806 and the planar blade 1808 design. The disk shaped protrusion 1806 being positioned in the plane of the rotor's 1802 rotation and the planar blades 1808 being perpendicular to both the plane and the axis of rotation cooperate to make the air moved within the housing 1600 directly strike the upstream edge 716 of the opening 1602. This embodiment of the invention which comprises the combination eight cavities 1602 in the housing 1600 and five blades 1808 on the rotor 1802 results in a unique operational combination which greatly reduces and nearly eliminates the blade passing frequency produced when invention is being used. FIGS. 18D-18F show, external, exploded, and cross-sectional views of a similar embodiment of the present invention. Following the top cover 1810, fabric wrap 1812, combined housing 1600 and shell 1702, and rotor 1802 displayed in FIG. 18E are combined to result in the assembled embodiment depicted in FIGS. 18D and 18F. Further, in FIG. 18E, one can see how the rotor 1802 is mounted on the motor 608 positioned on the axis of the bottom portion 1504 of the housing.

Figure 19A:
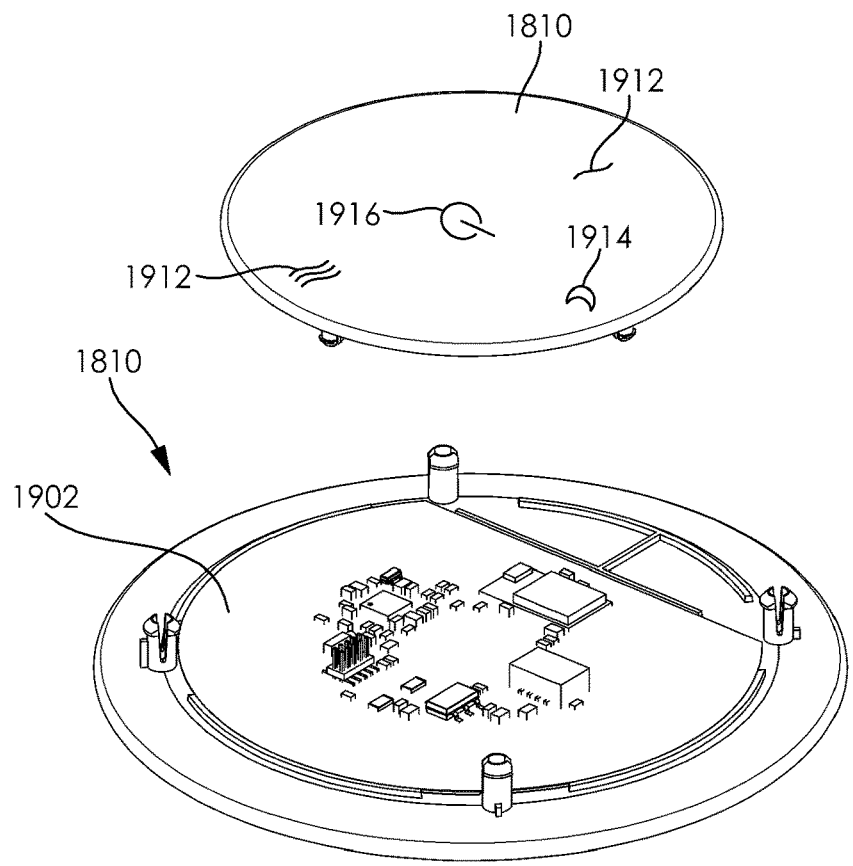
FIGS. 19A-19D are cross-sectional and exploded views displaying the internal components of an acoustic white noise machine in accordance with an embodiment of the present invention.
Figure 19B:
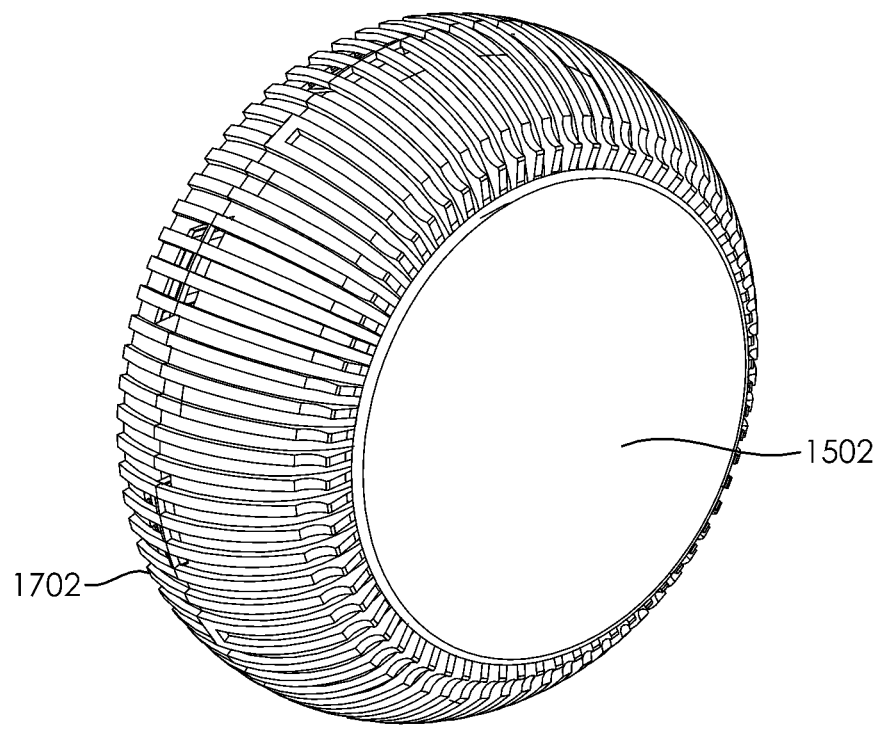
Figure 19C:
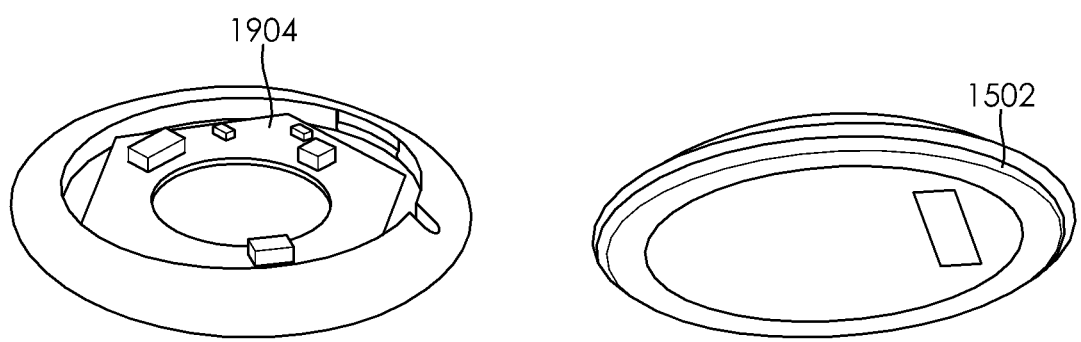
Figure 19D:
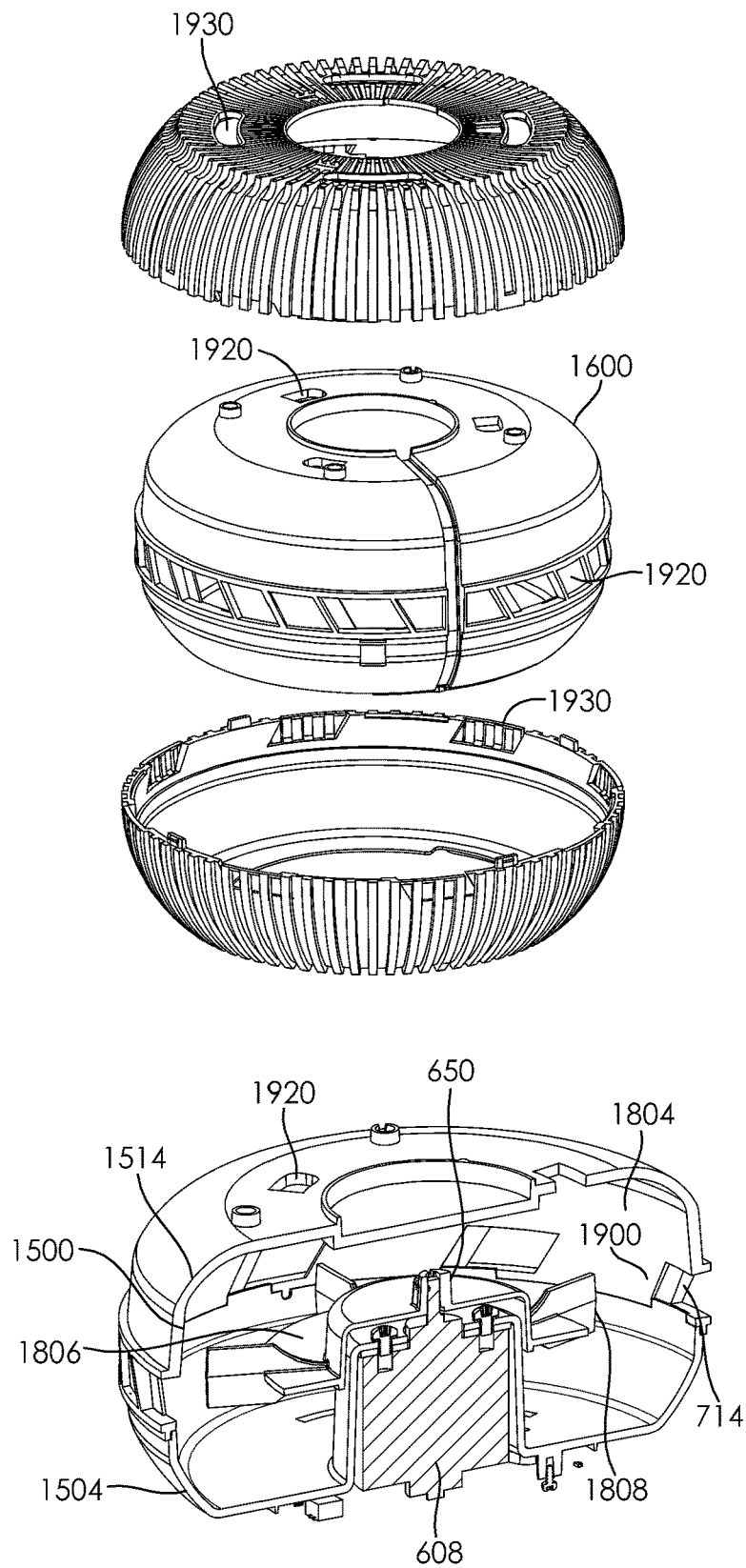

An exemplary embodiment of the control means discussed above as well as of a first circuit board 1902 and second circuit board 1904 are shown in FIGS. 19A-19C. The control means 106 of the embodiment depicted comprise a touchpad with touch-sensitive areas corresponding to volume 1912, light 1914, and power 1916 controls respectively which through an electrical connection to one or both of the first circuit board 1902 and second circuit board 1904 enable a user of the embodiment to control its operation and adjust its operational settings. Furthermore, a more detailed view of the shell 1702 and housing 1600 of an embodiment of the present invention is available in FIG. 19D. The plurality of openings 1920 going through the top and the middle portions housing 1600 of the embodiment are visible as are the openings 1930 in the top and bottom portions of the outer shell 1702. The rotation of the outer shell 1702 around the housing 1600 of this embodiment simultaneously changes the overlap of the shell openings 1930 and housing openings 1920 respectively and consequently alters the dimensions of the combined opening 1602. This results in a convenient and precise ability to adjust the tone and volume of the noise produced by the embodiment of the invention.

These arrangements of components allow for the unique method of operation and customization of an acoustic white noise generating machine. For example, a user of a preferred embodiment of the invention can adjust the size of more than one opening in the machine simultaneously. This action can alter the amount of airflow sheared by the openings and the frequencies of sound which resonate within the machine. Taking advantage of the compact assembly of the housing and conveniently rotatable components of the embodiment of the present invention, a user's rotation of a rotatable component simultaneously adjusts the size of both the holes through which air enters the device and the holes through which it exits the device. In an embodiment of the present invention the intake ports 702 on the top portion 1504 and the openings in the housing 1600 of an embodiment of the invention are coupled with the openings in an outer element of the embodiment in such a manner that a displacement altering the position or dimensions of an intake port results in a corresponding adjustment of an opening. Therefore, the opening and closing of at least one of the cavities displaced circumferentially around the housing is coupled with the opening and closing of the intake ports allowing the user to adjust them simultaneously to control the volume and tone of the noise produced by the device. Furthermore, the incorporation of the wireless communication means and a remote computing device 502 enables ability user to calibrate the sound level of a white noise machine. By measuring the sound level of the machine with a remote portable computing device 502; and adjusting the sound level of the machine either through manual controls 106 or via said remote computing device 502 until the sound level measurement reaches a predetermined value a user can ensure that the device is operating at safe volume levels. Consequently, the aforementioned wireless communication also allows a user to operate a white noise machine by wirelessly connecting the machine to communicate with a remote computing device 502 and then physically interacting with digital representations of control means 2002, 2004, 2006, 2008, 2010 (described below) produced by the remote computing device to perform an action selected from the following: turning the machine on/off, setting a timer or, altering the volume, calibrating to a predetermined noise level, turning a lighting element of the machine on/off, or any combination thereof.

EXEMPLARY EMBODIMENTS

Accordingly, a preferred embodiment of the present invention comprises an oblate housing 1600 comprising a top portion 1514 and a bottom portion 1504, with each of top portion 1514 and bottom portion 1504 having an inner surface and an outer surface, wherein said top portion 1514 and said bottom portion 1504 are configured to securely engage each other via an attachment means 1202 displaced along a rim of at least one of said top portion 1514 and said bottom portion 1504 to form a cavity defined by respective inner surfaces 1900 of said top portion 1514 and bottom 1504 portion; said housing further comprising a curved wall 1500, said wall 1500 comprising a cylindrical frame 1201 displaced concentrically within a cylindrical band 1200, said wall 1500 further comprising a plurality of openings 1602, wherein a rotational displacement of the band 1200 relative to the frame 1201 determines the dimensions of each of said openings 1602; a motor enclosure 1820 displaced within said housing 1600, said motor enclosure comprising a motor 608 secured therein, and said motor enclosure 1820 further configured with means to isolate noise and vibration 1822; a fan 602 mounted on said motor 608, said fan 602 comprising a concave central dome 1804 and further comprising a plurality of blades 604, wherein said central dome 1804 is shaped to partially wrap-around said motor enclosure 1820 and each of said blades 604 comprise a first end 630 integrally fused to said central dome 1804 and further comprise a tip 640; a substantially rigid shell configured to envelop said housing, wherein said shell 1702 is rotatably connected to said housing 1600 to adjust the length and depth of said openings 1602; a power source 304 and a circuit board 1902 electrically connected to each other, said power source 304 and said circuit board 1902 electrically connected to said motor 608 to regulate the operation of said fan 602; and a physical control means 106 disposed on said top portion 1514 adapted to effectuate manual regulation of the operation of said fan 602. In this embodiment, the frame 1201 and the band 1200 each respectively comprise a plurality of corresponding orifices 1604, 1606 configured to permit the passage of air between the interior and exterior of said housing 1600, while the openings 1602 of said wall 1500 are formed by a rotational displacement of said band 1200 relative to said frame 1201 offsetting each corresponding orifice 1604, 1606 with respect to one another to create an upstream edge 716 and a downstream edge 714 for each opening 1602, and wherein each of said openings 1602 comprise a recessed lip 1612 formed along the length of the downstream edge 714. The top portion of said housing 1600 comprises a plurality of vents and the motor enclosure 1820 is preferentially disposed concentrically along a central vertical axis of said bottom portion 1504 of said oblate housing 1600 and therein the motor 608 comprises a rotatable mounting means 650 on which said fan 602 is mounted. Each of the blades 604 in this embodiment radially projects from said concave central dome 1804 and each of said blades 604 is shaped concavely with a concavity corresponding in direction to a curvature of said top portion 1514 of said housing 1600. Optionally, embodiments of the invention may also have each of said blades 604 modified in any for the following manners independently or in combination with each other: having one or more slits 913 of various configurations and an outwardly bent tip 916. The preferred embodiment's shell 1702 may comprise at least the same number of openings 1704 as said frame 1201 permitting the passage of air through said shell 1702 and the embodiment may further comprise a wireless communication means electrically connected to a circuit board with the wireless communication means configured to be communicatively coupled to a computing device 502 enabling the operation of said fan 602 to be controlled via said computing device 502. Embodiments of the invention may also comprise at least one foot pad 1502 attached to said bottom portion 1504 of said housing 1600, said at least one foot pad 1502 creating a vibrationally dampening cushion between said housing 1600 and a surface on which said housing 1600 is placed, and they may further comprise a permeable elastic covering 1812 surrounding an outer surface of said shell 1702 to disperse airflow.

Another preferred embodiment of the invention comprises a concave enclosure 102 having an inner surface 1900 and an outer surface, said enclosure 102 comprising an upper portion 1514 and a lower portion 1504 affixed to each other along a cross-sectional perimeter of said enclosure 102; said enclosure further comprising a ceiling and a cylindrical wall 1500, wherein said wall 1500 comprises an outer cylinder 1200 comprising an inner surface and an outer surface and further comprises an inner cylinder 1201 positioned concentrically with said outer cylinder 1200 and in immediate contact with said inner surface of said outer cylinder 1200, where each of said ceiling and said wall 1500 further respectively comprise a plurality of openings 1602, wherein a rotational displacement of said cylinders 1200, 1201 relative to each other alters the size of more than one of said openings 1602; a vibrationally dampened drive module 1822 connected to said lower portion 1504 of said enclosure 102, said drive module 1822 comprising a motor 608 and configured with means to isolate motor noise; a rotor 1802 rotatably attached to said drive module 1822, said rotor 1802 comprising a curved central frame 1804 and further comprising a plurality of blades 1808, wherein said central frame 1804 curves partially around said drive module 1822 and each of said blades 1804 is integrally fused to said central frame 1804; an exterior shell 1702 configured to encase said enclosure 102 along a perimeter of said enclosure 102, wherein said shell 1702 is rotatably engaged with said enclosure 102 so that a rotation of said shell around said enclosure modifies the dimensions of said openings 1602; a power source 304 and a circuit board 1904 electrically connected to each other, said power source 304 and said circuit board 1904 electrically connected to said motor 608 to regulate the operation of said rotor 1802; and a physical control means 106 disposed on said upper portion 1514 adapted to effectuate manual regulation of operational settings of the device. The rotor of this embodiment comprises a disc shaped protrusion 1806 integrally fused to both of said central frame 1804 and said plurality of blades 1808, wherein said protrusion 1806 is coplanar with its plane of rotation and extends perpendicularly from a central vertical axis of said lower portion 1504 of said enclosure 102, and wherein each of said blades 1808 extend perpendicularly to said frame 1804 and said protrusion 1806. The preferred embodiment of the invention also comprise a light emitting means 402 electrically connected to said circuit board 1904 and further comprising at least one foot pad 1502 attached to said lower portion 1504 of said enclosure 102, said at least one foot pad 1502 creating a vibrationally dampening cushion between said enclosure 102 and a surface on which said enclosure 102 is placed. A porous flexible outer wrap 1812 envelops an exterior surface of said shell to disperse airflow and limit the draft of air exuding from the device, and a power cord storage compartment 302 is provided to house the power source 304 connection.

FIGS. 20A-20D show different operational states of a GUI of a mobile computing device 502 configured to wirelessly control the operation of the components of a white noise machine in accordance with an embodiment of the present invention. The GUI interface provides virtual representations of controls to adjust the volume 2002, to turn the machine on/off 2004, and to turn a light emitting element of the embodiment on/off 2006. Turning to FIG. 20B, controls for setting a timer 2008 for the operation of the embodiment of the invention are shown. Controls for initiating a sound level calibration 2010 and the sound level measurement indicator 2012 are depicted in FIGS. 20C and 20D respectively. Since the controls displayed in the GUI are virtual representations of physical controls, this embodiment of the invention provides a convenient way of remotely controlling and adjusting the operation of the white noise machine via a mobile computing device that is wirelessly connected to a wireless communication module of the circuit board. One of ordinary skill in the art should understand that there are various ways that the control means can be virtually represented via a remote or mobile computing device and that the embodiments of the present invention are contemplate to operate with any combination thereof.

Any element in a claim that does not explicitly state "means for" performing a specified function, or "step for" performing a specific function, is not to be interpreted as a "means" or "step" clause as specified in 35 U.S.C § 112, ¶6. In particular, the use of "step of" in the claims herein is not intended to invoke the provisions of 35 U.S.C § 112, ¶6.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:

1. A machine for generating acoustic white noise comprising:
an oblate housing comprising a top portion and a bottom portion each of which have an inner surface and an outer surface, wherein said top portion and said bottom portion are configured to securely engage each other via an attachment means displaced along a rim of at least one of said top portion and said bottom portion to form a cavity defined by said inner surface of said top portion and bottom portion;
said oblate housing further comprising a curved wall, said curved wall comprising a cylindrical frame displaced concentrically within a cylindrical band, said curved wall further comprising a plurality of openings, wherein a rotational displacement of said cylindrical band relative to said cylindrical frame determines a dimensions of each of said openings;
a motor enclosure displaced within said housing, said motor enclosure comprising a motor secured therein, and said motor enclosure further configured with a means to isolate noise and vibration;
a fan mounted on said motor, said fan comprising a concave central dome and further comprising a plurality of blades, wherein said concave central dome is shaped to partially wrap around said motor enclosure and each of said blades comprise a first end integrally fused to said concave central dome and a second end forming a blade tip;
a substantially rigid shell configured to envelop said housing, wherein said shell is rotatably connected to said housing to adjust the length and depth of said openings;
a power source and a circuit board electrically connected to each other, said power source and said circuit board electrically connected to said motor to regulate a operation of said fan; and
a physical control means disposed on said top portion adapted to effectuate manual regulation of the operation of said fan.

2. The machine of claim 1 wherein each of said cylindrical frame and said cylindrical band comprise a plurality of corresponding orifices configured to permit a passage of air between a interior and exterior of said oblate housing.

3. The machine of claim 2 wherein said openings of said curved wall are formed by a rotational displacement of said cylindrical band relative to said cylindrical frame offsetting each corresponding orifice with respect to one another to create an upstream edge and a downstream edge for each opening, and wherein each of said openings comprise a recessed lip formed along the length of said downstream edge.

4. The machine of claim 1 wherein said top portion of said oblate housing comprises a plurality of vents.

5. The machine of claim 1 wherein said motor enclosure is disposed concentrically along a central vertical axis of said bottom portion of said oblate housing and wherein said motor comprises a rotatable mounting means on which said fan is mounted.

6. The machine of claim 1 wherein each of said blades radially projects from said concave central dome.

7. The machine of claim 1 wherein each of said blades is shaped concavely with a concavity corresponding in direction to a curvature of said top portion of said oblate housing.

8. The machine of claim 1 wherein each of said blades comprises a modification selected from the group of at least one slit, an outwardly bent tip, and combinations thereof.

9. The machine of claim 1 wherein shell comprises at least the same number of openings as said cylindrical frame permitting a passage of air through said shell.

10. The machine of claim 1 further comprising a wireless communication means electrically connected to said circuit board, said wireless communication means configured to be communicatively coupled to a computing device enabling a operation of said fan to be controlled via said computing device.

11. The machine of claim 1 further comprising at least one foot pad attached to said bottom portion of said oblate housing, said at least one foot pad creating a vibrationally dampening cushion between said oblate housing and a surface on which said oblate housing is placed.

12. The machine of claim 1 further comprising a permeable elastic covering surrounding an outer surface of said shell to disperse airflow.

13. A device for creating turbulent broadband noise, the device comprising
a concave enclosure having an inner surface and an outer surface, said enclosure comprising an upper portion and a lower portion affixed to each other along a cross-sectional perimeter of said concave enclosure;
said concave enclosure further comprising a ceiling and a cylindrical wall, wherein said cylindrical wall comprises an outer cylinder comprising an inner surface and an outer surface and further comprises an inner cylinder positioned concentrically within said outer cylinder and in immediate contact with said inner surface of said outer cylinder, where each of said ceiling and said cylindrical wall are formed with a plurality of openings, wherein a rotational displacement of said cylinders relative to each other alters a size of more than one of said openings;
a vibrationally dampened drive module connected to said lower portion of said concave enclosure, said vibrationally dampened drive module comprising a motor and configured with means to isolate motor noise;
a rotor rotatably attached to said vibrationally dampened drive module, said rotor comprising a curved central frame and further comprising a plurality of blades, wherein said curved central frame curves partially around said vibrationally dampened drive module and each of said blades is integrally fused to said curved central frame;
an exterior shell configured to encase said concave enclosure along a perimeter of said concave enclosure, wherein said exterior shell is rotatably engaged with said concave enclosure so that a rotation of said shell around said enclosure modifies a dimensions of said openings;
a power source and a circuit board electrically connected to each other, said power source and said circuit board electrically connected to said motor to regulate do a operation of said rotor; and
a physical control means disposed on said upper portion adapted to effectuate manual regulation of operational settings of said device.

14. The device of claim 13 wherein said rotor further comprises a disc shaped protrusion integrally fused to both of said curved central frame and said plurality of blades, wherein said disc shaped protrusion is coplanar with its plane of rotation and extends perpendicularly from a central vertical axis of said lower portion of said concave enclosure, and wherein each of said blades extend perpendicularly to said curved central frame and said disc shaped protrusion.

15. The device of claim 13 comprising a light emitting means electrically connected to said circuit board and further comprising at least one foot pad attached to said lower portion of said concave enclosure, said at least one foot pad creating a vibrationally dampening cushion between said concave enclosure and a surface on which said concave enclosure is placed.

16. The device of claim 13 further comprising a porous flexible outer wrap enveloping an exterior surface of said exterior shell.

17. The device of claim 13 further comprising a power cord storage compartment.

\* \* \* \* \*